(12) United States Patent
Puranen et al.

(10) Patent No.: US 10,770,735 B2
(45) Date of Patent: Sep. 8, 2020

(54) PROTECTION ARRANGEMENT AND METHOD OF SOLID OXIDE CELLS

(71) Applicant: ELCOGEN OY, Vantaa (FI)

(72) Inventors: Jouni Puranen, Tampere (FI); Juha-Pekka Nikkanen, Tampere (FI); Mikko Kylmälahti, Toijala (FI)

(73) Assignee: ELCOGEN OY, Vantaa (FI)

( * ) Notice: Subject to any disclaimer, the term of this patent is extended or adjusted under 35 U.S.C. 154(b) by 268 days.

(21) Appl. No.: 15/838,953

(22) Filed: Dec. 12, 2017

(65) Prior Publication Data

US 2018/0166678 A1    Jun. 14, 2018

Related U.S. Application Data

(63) Continuation of application No. PCT/FI2015/050424, filed on Jun. 12, 2015.

(51) Int. Cl.
| | |
|---|---|
| H01M 8/0206 | (2016.01) |
| H01M 8/0228 | (2016.01) |
| C23C 4/129 | (2016.01) |
| C23C 4/11 | (2016.01) |
| H01M 8/12 | (2016.01) |
| H01M 8/0245 | (2016.01) |
| H01M 8/124 | (2016.01) |

(52) U.S. Cl.
CPC .............. *H01M 8/0206* (2013.01); *C23C 4/11* (2016.01); *C23C 4/129* (2016.01); *H01M 8/0228* (2013.01); *H01M 8/0245* (2013.01); *H01M 8/12* (2013.01); *H01M 2008/1293* (2013.01)

(58) Field of Classification Search
None
See application file for complete search history.

(56) References Cited

U.S. PATENT DOCUMENTS

| | | |
|---|---|---|
| 5,496,655 A | 3/1996 | Lessing |
| 5,942,349 A | 8/1999 | Badwal et al. |
| 8,349,395 B2 | 1/2013 | Laatsch et al. |
| 2004/0018409 A1* | 1/2004 | Hui ................. H01M 4/8621 429/489 |

(Continued)

FOREIGN PATENT DOCUMENTS

| | | |
|---|---|---|
| WO | WO 1996/028855 A1 | 9/1996 |
| WO | WO 2005/091408 A1 | 9/2005 |

(Continued)

OTHER PUBLICATIONS

International Search Report (PCT/ISA/210) dated Dec. 4, 2015, by the European Patent Office as the International Searching Authority for International Application No. PCT/FI2015/050424.

(Continued)

*Primary Examiner* — Jonathan Crepeau
(74) *Attorney, Agent, or Firm* — Buchanan Ingersoll & Rooney PC

(57) ABSTRACT

An object of the invention is a protection method of solid oxide cells, in which method is arranged gas flows in the cell by at least two cell structure plates made of metal. In the method is formed metal oxide material on metallic structure from liquid precursor containing at least metal ions and at least one of organic and inorganic compounds fed into thermal flame having average gas velocity over 200 m/s.

5 Claims, 6 Drawing Sheets

(56) References Cited

U.S. PATENT DOCUMENTS

| | | |
|---|---|---|
| 2007/0178004 A1 | 8/2007 | Laatsch et al. |
| 2007/0259126 A1 | 11/2007 | Vassen et al. |
| 2009/0305106 A1* | 12/2009 | Gell ........................ B82Y 30/00 |
| | | 429/488 |
| 2014/0030632 A1 | 1/2014 | Larsen et al. |

FOREIGN PATENT DOCUMENTS

| | | |
|---|---|---|
| WO | WO 2006/029587 A1 | 3/2006 |
| WO | WO 2012/143118 A1 | 10/2012 |

OTHER PUBLICATIONS

Written Opinion (PCT/ISA/237) dated Dec. 4, 2015, by the European Patent Office as the International Searching Authority for International Application No. PCT/FI2015/050424.

International Preliminary Report on Patentability(PCT/IPEA/409) dated Jul. 26, 2017, by the European Patent Office as the International Preliminary Examining Authority for International Application No. PCT/FI2015/050424.

Fauchais et al., Key Challenges and Opportunities in Suspension and Solution Plasma Spraying, *Plasma Chemistry and Plasma Processing*, Nov. 5, 2014, pp. 511-525, vol. 35, No. 3, Springer US, U.S.A. https://doi.org/10.1007/s11090-014-9594-5.

* cited by examiner

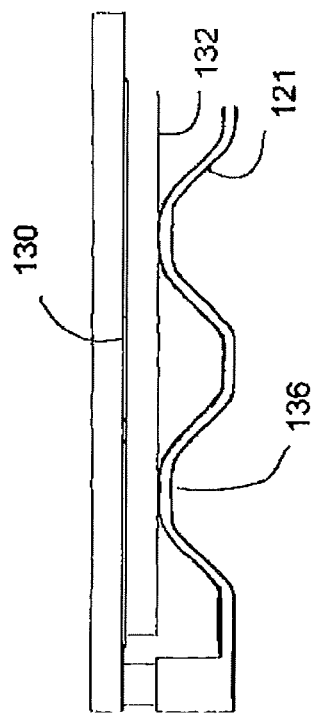
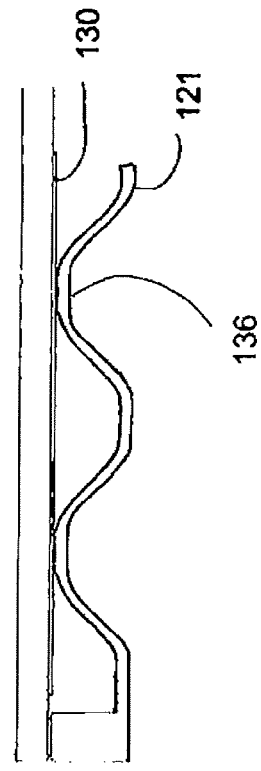
Fig. 3A
Fig. 3B

| Process description | Conventional thermal spraying (dry powder) | | Suspension thermal spraying (solvent and solid particles) | | Solution precursor thermal spraying (solution containing metallic salts) |
| --- | --- | --- | --- | --- | --- |
| | Solid state synthesis | Liquid state synthesis | Solid state synthesis | Liquid state synthesis | Liquid state synthesis |
| Mixing or diluting precursors | X | X | X | X | X |
| Calcination | | X | | X | |
| Milling* | X | X | X | X | |
| Sintering * (material synthesis) | X | X | X | X | |
| Milling | X | X | X | X | |
| Silting | X | X | X | X | |
| Spray drying (particle formation) | X | X | | | |
| Sintering | X | X | | | |
| Thermal spraying (melting) | X | X | X | X | X** |

\* Process steps are repeated until homogeneous powder composition is achieved
\*\* Droplet formation, materials synthesis and melting

Fig. 5

PROTECTION ARRANGEMENT AND METHOD OF SOLID OXIDE CELLS

THE FIELD OF THE INVENTION

Most of the energy of the world is produced by means of oil, coal, natural gas or nuclear power. All these production methods have their specific problems as far as, for example, availability and friendliness to environment are concerned. As far as the environment is concerned, especially oil and coal cause pollution when they are combusted. The problem with nuclear power is, at least, storage of used fuel.

Especially because of the environmental problems, new energy sources, more environmentally friendly and, for example, having a better efficiency than the above-mentioned energy sources, have been developed. Fuel cell's, by means of which energy of fuel, for example biogas, is directly converted to electricity via a chemical reaction in an environmentally friendly process and electrolysers, in which electricity is converted to a fuel, are promising future energy conversion devices.

Renewable energy production methods such as photovoltaic and wind power faces problems in seasonal production variations as their electricity production is limited by environmental effects. In the case of over production, hydrogen production through water electrolysis is suggested to be one of the future energy storing options. Furthermore, an electrolysis cell can also be utilized to produce high quality methane gas from renewably biogas stores.

STATE OF THE ART

Fuel cell, as presented in FIG. 1, comprises an anode side 100 and a cathode side 102 and an electrolyte material 104 between them. In solid oxide fuel cells (SOFCs) oxygen 106 is fed to the cathode side 102 and it is reduced to negative oxygen ion. The negative oxygen ion goes through the electrolyte material 104 to the anode side 100 where it reacts with fuel 108 producing electrons, water and also typically carbon dioxide (CO2). Anode 100 and cathode 102 are connected through an external electric circuit 111 comprising a load 110 for the fuel cell withdrawing electrical energy alongside heat out of the system. The fuel cell reactions in the case of methane, carbon monoxide and hydrogen fuel are shown below:

Anode: $CH_4 + H_2O = CO + 3H_2$ $CO + H_2O = CO_2 + H_2$ $H_2 + O^{2-} = H_2O + 2e^-$ Cathode: $O_2 + 4e^- = 2O^{2-}$ Net reactions: $CH_4 + 2O_2 = CO_2 + 2H_2O$ $CO + \frac{1}{2}O_2 = CO_2$ $H_2 + \frac{1}{2}O_2 = H_2O$ In electrolysis operating mode (solid oxide electrolyzer cells (SOEC)) the reaction is reversed, i.e. heat, as well as electrical energy from a source 110, are supplied to the cell where water and often also carbon dioxide are reduced in the cathode side forming oxygen ions, which move through the electrolyte material to the anode side where oxygen oxidation reaction takes place. It is possible to use the same solid electrolyte cell in both SOFC and SOEC modes.

Solid oxide electrolyser cells operate at temperatures which allow high temperature electrolysis reaction to take place, said temperatures being typically between 500-1000° C., but even over 1000° C. temperatures may be useful. These operating temperatures are similar to those conditions of the SOFCs. The net cell reaction produces hydrogen and oxygen gases. The reactions for one mole of water are shown below:

Cathode: $H_2O + 2e^- \rightarrow 2H_2 + O^{2-}$

Anode: $O^{2-} \rightarrow \frac{1}{2}O_2 + 2e^-$

Net Reaction: $H_2O \rightarrow H_2 + \frac{1}{2}O_2$,

In Solid Oxide Fuel Cell (SOFC) and Solid Oxide Electrolyzer (SOE) stacks where the flow direction of the cathode gas relative to the anode gas internally in each cell as well as the flow directions of the gases between adjacent cells, are combined through different cell layers of the stack. Further, the cathode gas or the anode gas or both can pass through more than one cell before it is exhausted and a plurality of gas streams can be split or merged after passing a primary cell and before passing a secondary cell. These combinations serve to increase the current density and minimize the thermal gradients across the cells and the whole stack.

SOFC and SOEC stacks comprise stacked cell elements and separators in a sandwiched manner wherein each cell element is constituted by sandwiching an electrolyte, the anode side and the cathode side. The reactants are guided by flow field plates to the porous electrodes.

A SOFC delivers in normal operation a voltage of approximately 0.8V. To increase the total voltage output, the fuel cells are usually assembled in stacks in which the fuel cells are electrically connected via flow field plates (also: separator plates, interconnect plates, interconnector plates, bipolar plates, current collector plates). The desired level of voltage determines the number of cells needed.

Bipolar plates separate the anode and cathode sides of adjacent cell units and at the same time enable electron conduction between anode and cathode.

Interconnects, or bipolar plates are normally provided with a plurality of channels for the passage of fuel gas on one side of an interconnect plate and oxidant gas on the other side. The flow direction of the fuel gas is defined as the substantial direction from the fuel inlet portion to the fuel outlet portion of a cell unit. Likewise, the flow direction of the oxidant gas, the cathode gas, is defined as the substantial direction from the cathode inlet portion to the cathode outlet portion of a cell unit.

Conventionally, the cells are stacked one on top of each other with a complete overlap resulting in a stack with for instance co-flow having all fuel and oxidant inlets on one side of the stack and all fuel and oxidant outlets on the opposite side. One feature affecting the temperatures of the structure in operation is steam reformation of the fuel that is fed into the cell. Steam reformation is endothermic reaction and cools the fuel inlet edge of the cell. Due to the exothermicity of the electrochemical process, the outlet gases leave at higher temperature than the inlet temperature. When endothermic and exothermic reactions are combined in an SOFC stack a significant temperature gradient across the stack is generated. Large thermal gradients induce thermal stresses in the stack which are highly undesirable and they entail difference in current density and electrical resistance. Therefore the problem of thermal management of an SOFC stack exists: to reduce thermal gradients enough to avoid unacceptable stresses and to maximize electric efficiency through homogenous current density profile.

It is often necessary in prior art embodiments to protectively coat the flow field plates in order to slow down corrosion of the metal. Generally there are two corrosion mechanisms that cause aging to solid oxide fuel cells and electrolyzers. One is the formation of an oxide layer or layers, that conducts electricity poorly, onto the metal surface and another the settling of chrome compounds evaporating from metal onto the active surfaces of the unit cell and reaction with electrochemically active materials weakening the electrochemical, chemical, electrical conductivity and/or gas permeability properties of the active material. Oxide structures are generally used as protective coatings that on one hand slow down oxidant diffusion onto the surface of the metal and on the other hand diffusion of alloy atoms and compounds through the oxide structure. The price of the protective coating is typically significant within the total costs of the cell stack and cost of the protective coating is on one hand influenced by the fabrication process used for the protective coating, the material and the surface to be coated protectively. Additionally it is not preferable to extend the protective coating to areas, which are used to seal the cell stack, because glass, ceramic materials or minerals generally used as sealants can react with the protective coating causing aging effects to the cell stack structures, for example because of increased gas leakages and/or increased electric conductivity.

The state of the art interconnect structures are made with forming processes from sheet metal plates. The maximum formability of the metal is limited by its mechanical properties and typically both the channel area and the contact surfaces are not optimal as described above. Because of the limitation associated to the forming processes, interconnect plate structures either cause major pressure loss characteristics and/or the contact surface limits the electron transfer in the fuel cell both causing restrictions to the duty ratio of fuel cell or electrolyzer stack.

The performance of the protective coatings in SOFC interconnects is strongly linked to the chemical composition and microstructure of the deposited coatings. Since degradation of the cathode is a consequence of reactions between the cathode materials and volatile Cr oxide and oxyhydroxides, i.e., $CrO_3$, $CrO_2(OH)_2$ and $CrO_2(OH)$, which are transported through the gas phase on the triple-phase boundary (TPB), these coatings should have a dense microstructure. A dense microstructure is essential in harsh environments (high humidity and operating temperature) in order to decrease the growth of Cr-rich oxide scale, which may lead to uncontrolled breakaway oxidation and/or increase the ohmic resistance of the substrate-coating systems.

Protective coatings are formed with thermal spraying techniques. A problem with conventional thermal spraying methods such as atmospheric plasma spraying (APS) and high velocity oxy-fuel spraying (HVOF) is that the protective coating must be thick, e.g. 30 μm-50 μm in order to be dense and protective enough. This also increases the material costs of the prior art thermal spraying. Relatively high coating thickness, in addition to material synthesis and powder manufacturing prior the spraying process increase the total spraying cost.

In prior art document WO 96/28855 A1 is presented spray pyrolysis embodiments, in which no thermal flame is utilized in spraying and where solution is sprayed on to preheated substrate. Thus, in WO 96/28855 A1 the sprayed surface coating requires separate thermal processing i.e. post-treatment processes (calcination and sintering), which requires a long processing time. Another drawback is that due to the long processing time a $Cr_2O_3$ or other equally harmful Cr-compound layer has enough time to be formed.

In prior art document Fauchais P et al: "Key challenges and opportunities in solution and suspension plasma spraying" is presented a HVOF suspension method and solution precursor plasma spraying, not the HVOF precursor method. The main difference is that the HVOF suspension method requires many time consuming process phases i.e. multiple calcination steps, milling, mixing and silting phases and optimizing the stability properties of the suspensions in order to obtain optimal feedstock to be used in the spray processes.

In prior art document WO2005/091408 A1 is presented deposition methods which are based on screen-printing. When employing a screen printing as deposition method, coating material must be first synthesized by using similar process steps as manufacturing suspensions, and when deposited, the coatings are always heat treated which results to a formation of $Cr_2O_3$ or similar layer.

In prior art document WO 2012/143118 A1 is presented on pre-treatment of substrate based on heating and etching processes, in order to obtain optimal substrate roughness to provide adequate adhesion between the substrate and deposited coating. Unlike the processes mentioned in the document WO 2012/143118 A1 such as screen printing, wet powder spraying, flame spraying and other conventional thermal spraying techniques, pre-treatment processes are not needed in the HVOF precursor spraying process according to the present invention.

BRIEF DESCRIPTION OF THE INVENTION

The object of the invention is to accomplish an advanced protection arrangement and method to form protective coating with a dense microstructure or coating with nanoscaled closely packed particles, which are able to sinter and densify when energy (heat) is induced onto the cell structure plates of the cells to prevent corrosion and to improve lifetime and electrical efficiency of the cells. This is achieved by a protection arrangement of solid oxide cells, each solid oxide cell comprising at least two cell structure plates made of metal to arrange gas flows in the cell, and an active electrode structure, which comprises an anode side, a cathode side, and an electrolyte element between the anode side and the cathode side. The protection arrangement comprises means for forming metal oxide material on metallic structure from liquid precursor containing at least metal ions and at least one of organic and inorganic compounds fed into thermal flame having average gas velocity over 200 m/s.

The focus of the invention is also a protection method of solid oxide cells, in which method is arranged gas flows in the cell by at least two cell structure plates made of metal. In the method is formed metal oxide material on metallic structure from liquid precursor containing at least metal ions and at least one of organic and inorganic compounds fed into thermal flame having average gas velocity over 200 m/s.

The invention is based on formation of metal oxide material on metallic structure from liquid precursor, which contains at least metal ions and at least one of organic and inorganic compounds fed into thermal flame.

Benefit of the invention is that degradation of the cathode can be successfully prevented resulting in a better duty ratio of the solid oxide cells' or electrolyzer cells' operation. A longer lifetime of the solid oxide cells can be achieved, thus making power operation of the entire cell system better and more economical as compared to the prior art embodiments.

BRIEF DESCRIPTION OF THE DRAWINGS

FIGS. 3A and 3B present an exemplary solid oxide cell structure according to the present invention.
FIG. 5 presents an exemplary process step listing according to the present invention and comparison for conventional thermal spraying processes.

DETAILED DESCRIPTION OF THE INVENTION

Figure 1:
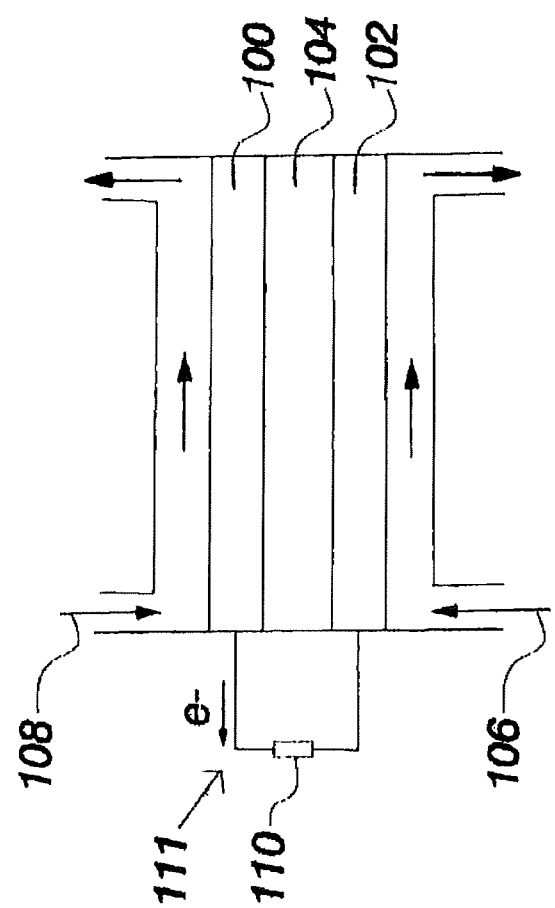
FIG. 1 presents a single fuel cell structure.
Figure 2:
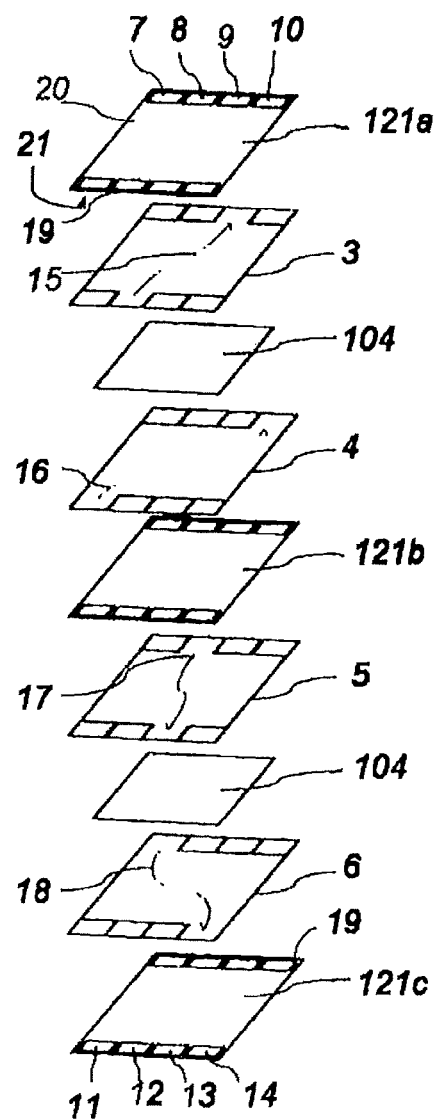
FIG. 2 presents exemplary flow field plates.

FIG. 2 shows exemplary flow field plates 121a, 121b, 121c of a fuel cell. A complete fuel cell stack comprises several plates 121 placed on successively each other in a shown manner. The plates in this embodiment are rectangular and symmetrical. An electrolyte element structure 104 comprising an electrolyte layer between an anode electrode and a cathode electrode is placed between the plates 121 generally in the middle of the plate. The electrolyte element structure 104 may be any suitable electrolyte element structure and is not therefore described herein in any further detail. The flow field plates 121 and the electrolyte element structure 104 are sealed with sealing means 3-6. The purpose of the sealing means 3-6 is to ensure that oxidant and fuel are not directly mixed without the fuel cell reactions inside the electrochemically active area, that the fuel and oxidant are not leaked out from the electrochemical cells, that the adjacent electrochemical cells are not in electronic contact with each other, and that oxidant and fuel are supplied to the desired flow field plate planes 121. Two opposing flow field plates 121a, 121b, 121c and the electrolyte element structure 104 therebetween form a single repetitious structure. A flow field plate 121 is a planar thin plate that is made of metal alloy, ceramic material, cermet material or other material that can withstand chemical, thermal and mechanical stresses that are present in a fuel cell. According to the invention, the flow field plate 121 comprises inflow and outflow orifices placed at the edges of the plate 121. In this example the plate 121 is rectangular and flow orifices are placed on slightly shorter edges 19. Both of the edges 19 have four orifices, one inflow orifice 7, 11 for oxygen rich gas (in following exemplary embodiment: air), one outflow orifice 10, 14 for air, one inflow orifice 8, 12 for fuel, and one outflow orifice 9, 13 for fuel. The oxygen rich gas can be any gas or gas mixture, which comprises a measurable amount of oxygen. On both of the edges 19 the orifices are arranged in a sequence that has first air in 7, 11, then fuel in 8, 12, then fuel out 9, 13, and then air out 10, 14. The surfaces of the first face 20 (in the fig. top surface) and the second face 21 (below surface, not shown) around the edges of the flow field plate are shaped to allow efficient sealing and they limit a contoured surfaces 15-18 in the middle of the flow field plate that has a specific contour for guiding fuel gas and air over the surfaces of the electrolyte elements 104. It should be noted, that the reference numerals 15-18 that depict arrows related to sealing means 3-6 that illustrate gas flow routes in FIG. 1 are also used to refer to a face and a contoured surface 15-18 of a flow field plate 121a, 121b, 121c that is facing towards the sealing means 3-6 that faces the sealing element or structure in question.

The number of the orifices for arranging the gas flows on a fuel cell stack may vary as well as the way how the gas flows are arranged. The basic idea is that orifices 7-14 on superposed flow field plates 121 are arranged so that their positions are matched and the orifices in same line form a gas manifold channel through the stack. Sealing means 3-6 are used in order to prevent feeding of the fuel and air to wrong layers between electrolyte elements and the flow field plates. The sealing means are arranged to surround each orifice 7-14 on the flow field plate 121. The flow field plate 121 and the sealing elements 3-6 are used to form ducts (i.e. channels) that go through whole fuel cell stack. The orifices in the flow field plates are super positioned in order to form such a duct.

The fuel and oxygen rich gas flow directions on the electrolyte element compared to each other can be arranged to so called co-flow arrangement where both gas flows have essentially the same direction or to so-called counter-flow arrangement where the gas flow directions differ from each other essentially by 180°.

FIGS. 3A and 3B illustrate a preferred contacting arrangement of solid oxide cell structure according to the present invention. The solid oxide cell can be e.g. a fuel cell or an electrolyzer cell. Structure of the solid oxide cell is planar in the preferred embodiments according to the present invention, but the invention can also be utilized in other kind of solid oxide cell structures. Thickness of the anode is typically 200 micrometers or more, thickness of the electrolyte is typically 1-10 micrometers and thickness of the cathode is typically 30-100 micrometers in anode supported solid oxide cell structure. Thickness of the anode is typically 30 micrometers or more, thickness of the electrolyte is typically 30 micrometers or more and thickness of the cathode is typically 30-100 micrometers in electrolyte supported solid oxide cell structure. Each solid oxide cell comprises at least two flow field plates 121 to arrange gas flows in the cell, and an active electrode structure 130, which is in more detail presented in FIG. 1 comprising an anode side 100, a cathode side 102, and an electrolyte element 104 between the anode side and the cathode side. The contacting arrangement comprises a gasket structure 128 to perform sealing functions in the solid oxide cell and a contact structure 132 locating between the flow field plates 121 and the active electrode structure 130. The contact material can be made of electrically conducting material, such as metal or ceramics. The contact structure 132 is at least partly adapted by a gas permeable structure according to structures of the flow field plates 121 and according to structure of the active electrode structure 130. In preferred embodiments according to the present invention the contact structure 132 is planar and platy, but also other forms can be utilized.

According to the present invention, the fuel cell or electrolyzer stack comprises at least one single repetitious structure. A single repetitious structure comprises at least of one electrochemically active electrolyte element structure including fuel side, electrolyte in between, and oxygen rich side, placed between at least two flow field plates the other distributing oxygen rich gas in the oxygen rich side of the electrolyte element structure and the other distributing fuel gas in the fuel side of the electrolyte element, and at least one sealing means sealing the gas atmosphere at its intended enclosure. The flow field plate has at least one inlet openings for fuel gas and/or oxygen rich gas and at least one outlet openings for used fuel gas and/or oxygen rich gas.

The preferred manufacturing methods for forming the contoured (as example: corrugated) surface are methods using plastic deformation such as stamping, pressing and like, wherein the shape of the material is changed but no material is added or removed, or methods wherein material is added such as welding or removed such as etching. Other manufacturing methods can be utilized if the flow field material is brittle such as extrusion, casting, printing, molding, and like. The orifices for fuel and air can be usually made in a same manufacturing step.

Each flow field plate 121 can be made similar in the stack assembly structure, thus only one type of plate is needed to produce a fuel cell stack having desired amount of repetitious electrolyte element structures 104. This simplifies the structure and eases manufacturing of the fuel cells.

In fuel cell and electrolyzer systems one of the most critical design functions is to maximize the efficiency of electricity production. This is affected considerably on one hand by the fuel cell's/electrolyzer's own inner efficiency, but also considerably by the energy needed for feeding the gases. On the other hand it is a requirement for the flow channel system to transfer generated and required electrons from one electrode to another. Thus the material of the flow channel system needs to be fabricated of material that is conducting electricity well. Additionally electrons collection from the electrode to interconnect plate structure needs to be arranged in a way that the portion of ohmic loss stays as small as possible in the area of the active electrode. The portion of loss in current collection of the active area is defined by the active area material's conductivity, thickness of the material, as well as the distance an electron travels when it either transfers from the flow channel plate onto the surface of the active electrode and from there to the place of reaction or respectively vice versa. A current collection area inside the flow channel plate on top of the active area that is too large again is not desirable, because then access for gases to the reaction surface is hindered. It is possible to find an optimum for the size of the contact surface between flow channel plate and active electrode, when supply of gases to the reaction surface as well as the electrons' travel are optimized and the fuel cell's/electrolyzer's performance and efficiency can thus be optimized.

Flow field plates 121, i.e. flow channel plates and interconnect plate structure, are generally fabricated of steel, because of its sufficient electrical conductivity, corrosion resistance, a thermal expansion coefficient similar to the unit cell and good formability properties. When steel plate is formed, the material stretches and thus thins in the locations of the formed areas. Each material has its own characteristic maximum for forming properties and if that is surpassed, ruptures and cavities form in the material. Additionally excessive forming of the material can thin the base material excessively increasing material corrosion and shortening the life of the fuel cell/electrolyzer. Therefore in material forming gentle and rounded shapes are aspired. Because forming sets boundaries on the design of the channel, either the contact surface or the height of the channel often stays too small increasing thus inner ohmic losses and/or flow pressure losses of the cell stack.

In the preferred arrangements according to the present invention the contact structure 132 is located between the flow field plates 121 and the cathode side 102 of the active electrode structure 130, but also other locations can be utilized in other embodiments of the invention.

The contact structure 132 according to the preferred embodiment of the present invention is adapted by a gas permeable structure by utilizing at least one of the following characteristics: form of the holes, size of the holes, distance between the holes, porosity of the structure 132 and tortuosity of the structure 132. The contact structure 132 can comprise e.g. rectangular holes, which can be extended to two adjacent gas channels to improve gas distribution characteristics e.g. by evening out differences between gas flows of said two adjacent gas flows. Gas distribution from the gas flow channels 136 to the active electrode structure 130 can be improved by increasing size of the holes, and by minimizing the distance between two adjacent holes. Electric conductivity, heat transfer characteristics and mechanical support of the structure can on the other hand be improved by increasing the distance between the two adjacent holes and by minimizing size of the holes.

Material of the contact structure 132 comprises e.g. of protectively coated metal or electrically conductive gas permeable ceramic sintered structure between the flow field plates 121 and the active electrode structure 130 to prevent evaporation of chrome containing species. Thickness of the contact structure 132 can be optimized according to at least one of the following characteristics: heat transfer characteristics, electrical characteristics of the contacting arrangement and gas distribution characteristics. Thickness of the gasket structure 128 can be adapted according to thickness of the contact structure 132 allowing more tolerance variations to thickness of solid oxide cells. The contact structure 132 can be made and processed by various manufacturing methods such as for example by: perforation, die cutting, etching, molding, rouletting a net structure, a porous sinter structure and/or an expanded mesh to form the gas permeable contact structure 132. Perforation means cutting rows and columns of small holes. Die cutting means a process of using a die to shear webs of low strength materials, i.e. clicking or dinking. Expanded mesh means producing expanded metal, a sheet or plate, by simultaneously slitting and stretching. Rouletting means accomplishing small horizontal and vertical cuts to the contact structure material.

The performance of the protective coatings in SOFC interconnects is strongly linked to the chemical composition and microstructure of the deposited coatings. Since degradation of the cathode is a consequence of reactions between the cathode materials and volatile Cr oxide and oxyhydroxides, i.e., $CrO_3$, $CrO_2(OH)_2$ and $CrO_2(OH)$, which are transported through the gas phase, or through migration, on the triple-phase boundary (TPB), these coatings should have a dense microstructure. A protective coating having dense microstructure is essential e.g. in harsh environments (high humidity and operating temperature) in order to decrease the growth of Cr-rich oxide scale, which may lead to uncontrolled breakaway oxidation and/or increase the ohmic resistance of the substrate-coating systems.

Although protective coatings can be manufactured various ways, the solution precursor thermal spray (SPTS) processes and especially high velocity solution precursor flame spray (HVSPFS) process shows greatest potential in coating technology field. The high velocity solution precursor flame spray (HVSPFS) deposition technique can be categorised under the solution precursor thermal spray processes (SPTS) represents a novel deposition technique in the thermal spraying field and it obtains the similar scalability for industrial-scale production as conventional thermal spraying techniques. Spinel coatings with advantageous properties for SOFC interconnects are obtained by using the high velocity solution precursor flame spray (HVSPFS) process. The clear advantage of the solution precursor thermal spray processes is the total length of the production chain to obtain as-sprayed coatings. As the materials synthesis and particle formation takes place during the spraying process 152 when fed in thermal flame, there is no need for separate materials synthesis, powder or paste preparation process phases as in the conventional thermal spraying processes or in the conventional wet-ceramic processes such as screen printing, dip-coating, slurry painting or similar processes as shown in FIG. 5. These phases require time (labour and storage costs) and energy (electricity), which inevitably leads to an increase in production costs. In addition, it was shown that the coatings could be produced by using relatively cheap raw materials, for instance metal nitrates or metal acetates In FIG. 5 is presented an exemplary schematic showing that method according to the present invention has substantially less process phases than conventional coatings methods, such as wet-ceramic processes or conventional dry powder thermal spraying processes. The main difference of the method according to the present invention compared to conventional dry powder spraying processes is that, separate material synthesis and powder preparation phases are no longer needed and therefore fewer process steps are required to obtain as-sprayed coatings.

These as-sprayed solution precursor thermally sprayed (SPTS) coatings have nano-scaled coating structures meaning that coatings are formed of solid particles with a size range of 10 nm up to several micrometers, or solids on the substrate through condense due to thermal gradient. In high velocity solution precursor flame spraying (HVSPFS), the coatings are mainly formed of the particles with the size range of 10 to 500 nm, due to effective droplet atomization during the spraying process, when fed in to high velocity and high temperature thermal flame 152. However, some micron sized particles are also formed with similar particle morphology as in conventional thermal spray processes. The sub-micron particles have polycrystalline characteristics, whereas nanoparticles had a more single crystal structure with fine equiaxed grains. Fast cooling rate of small splats induces a situation where homogeneous nucleation is competitive or predominant against heterogeneous nucleation.

The nano-scaled particle formation is a consequence of good atomization and evaporation of the precursor when injected into the high velocity thermal flame. The particles are formed through the liquid-to-solid and gas-to-solid conversion route. As a result, the as-sprayed coatings has a dense microstructure, which is favourable for preventing Cr transport and enabling good electrical properties. The dense microstructure is a consequence of high kinetic energy of thermal flame which enables high deposition velocity and closely packed structure of the small particles. Since it can be expected that the mass of the sub-micron and nano-scaled particles is negligible, the flight velocity of the particles can be close to the speed of the thermal flame.

Figure 4:
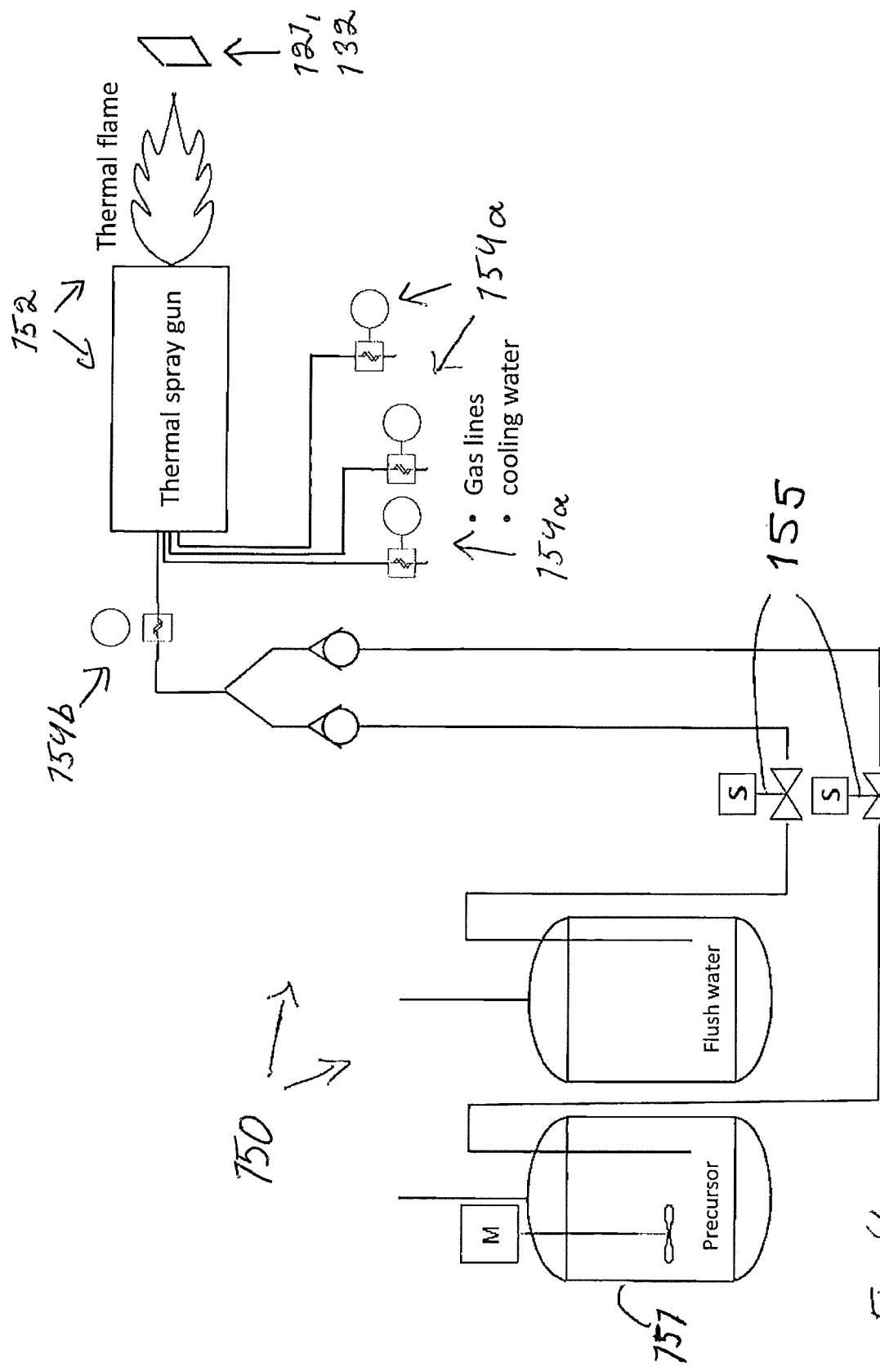
FIG. 4 presents an exemplary protection arrangement according to the present invention.

In FIG. 4 is presented an exemplary protection arrangement of solid oxide cells according to the present invention. Solid oxide cell can be e.g. a fuel cell or an electrolyzer cell. Each solid oxide cell comprises at least two cell structure plates 121 made of metal to arrange gas flows in the cell, and an active electrode structure 130, which comprises an anode side 100, a cathode side 102, and an electrolyte element 104 between the anode side and the cathode side. The protection arrangement comprises means 152 for forming metal oxide material on metallic structure 160 from liquid precursor containing at least metal ions and organic or inorganic compounds or both of them fed into high velocity thermal flame having average particle velocity over 200 m/s. The means 152 can be used for forming metal oxide coating e.g. on the cell structure plates 121. The formed coating on the cell structure plates 121 has preferably thickness less than 25 μm. The cell structure plates 121 can be for example flow field plates, separator plates, interconnect plates, interconnector plates, bipolar plates, current collector plates, etc.

Figure 6:
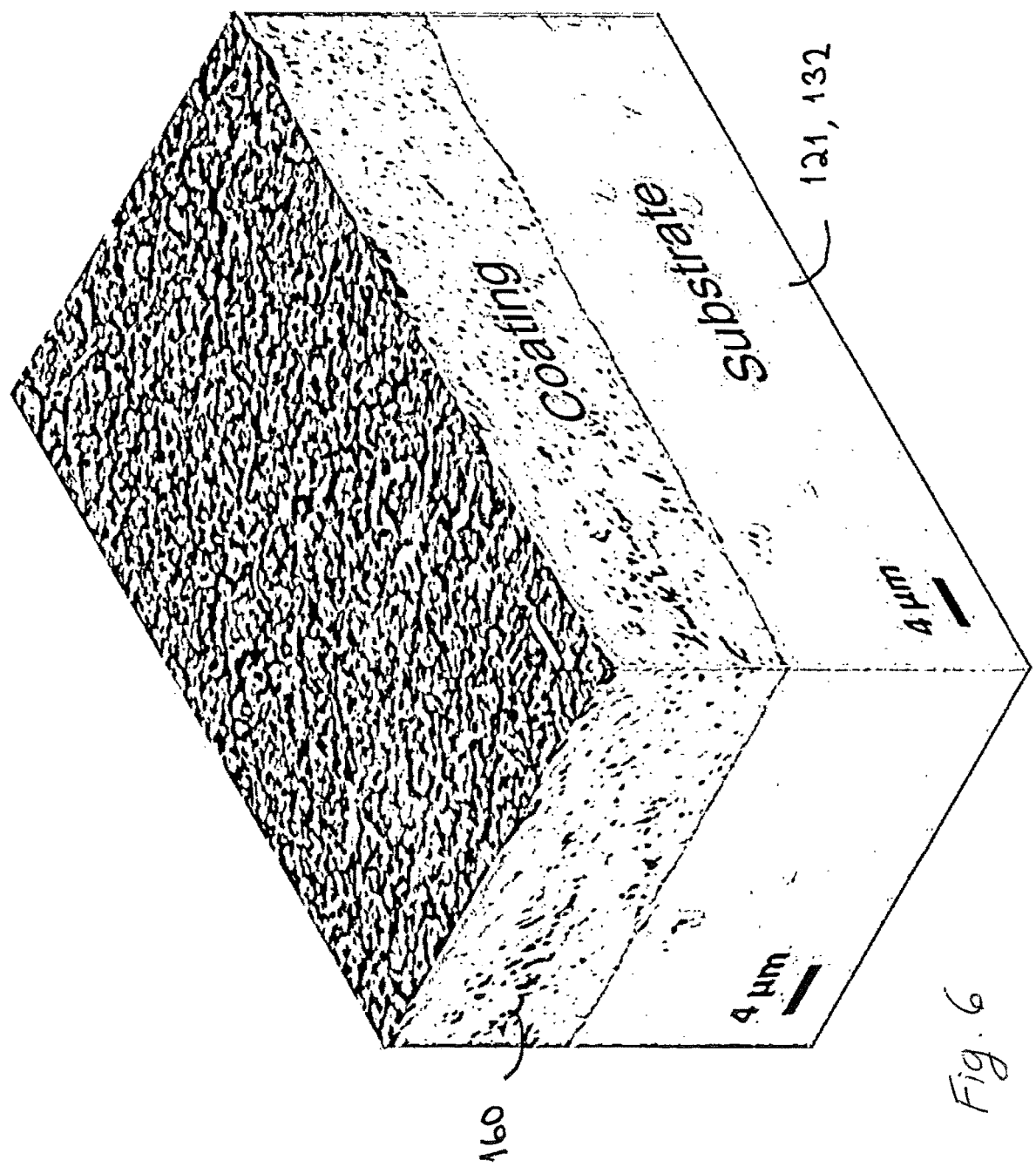
FIG. 6 presents a coating example according to the present invention.

In one exemplary embodiment the protection arrangement comprises thermal spraying means 152 for forming high temperature thermal flame to which liquid precursor is fed to form metal oxide compounds. Said liquid precursor comprises metal ions, which form the desired coating 160 with oxygen. The liquid precursor is formed from at least one of metal nitrates (manganese nitrates, cobalt nitrates, iron nitrates, etc.) and metal acetates (e.g. manganese acetates, cobalt acetates, iron acetates, etc), and from solvent formed at least one of organic compounds (ethanol, isopropanol, etc) and water in which solvent at least one of metal nitrates and metal acetates are dissolved, and from organic compounds which stabilize the liquid precursor through the chelation resulting to more homogenous mixture of metal complex (e.g. citric acid, glycine, carbamide, polyvinyl alcohol, etc). The liquid precursor is further formed from organic compounds that are exothermic above characteristic energy threshold level (e.g. citric acid, glycine, carbamide, polyvinyl alcohol, ethanol, isopropanol), and from organic compounds that form gases as a reaction product (e.g. citric acid, glycine, carbamide, polyvinyl alcohol, ethanol, isopropanol) and therefore further increase the atomization of the liquid precursor. In FIG. 6 is presented an exemplary coating 160 on the metallic substrate 121, 132.

In one embodiment according to the present invention the protection arrangement can comprise means 151 for controlling fraction of an organic or an inorganic precursor, for example so that total cationic concentration for precursors which form the metal oxide material is between 1 . . . 4.5 mol/L and organic compounds to regulate thermal and physical characteristics of the thermal spraying process and to improve atomization of the liquid precursor. The organic compounds can be e.g. citric acid, glycine, carbamide, etc. Said thermal and physical characteristics are e.g. atomization, evaporation, thermal decomposition, material synthesis and melting. The protection arrangement can further comprise means 151 for controlling fraction of at least one of water, metal nitrates, metal acetates, organic or inorganic compounds and alcohol based solvent (e.g. ethanol, isopropanol etc.) or mixture of various solvents (in a way that alcohol concentration may vary between 0 . . . 35 vol %) in liquid form, in order to regulate thermal and physical characteristics of the thermal spraying process and to improve atomization of liquid precursor. The means 150 can also be used in a preferred embodiment to form material containing at least water, metal nitrates, metal acetates, organic or inorganic additives and in liquid form in order to improve exothermic characteristics of the coating material.

In embodiments according to the present invention high temperature and high velocity thermal flame can be accomplished e.g. by combusting hydrocarbons either propane, propylene, hydrogen, ethylene, acetylene, kerosene or mixture of hydrocarbons with oxygen. In addition in some embodiments said flame can be formed by forming plasma plume by using one or two atom gases e.g. argon, helium, hydrogen or ternary gas mixtures. In one preferred protection arrangement according to the present invention the thermal spraying means 152 for forming high temperature and high velocity thermal flame by using hydrocarbons as a fuel (e.g. propane) and organic and/or inorganic additives or mixture of additives such as citric acid, glycine, carbamide, polyvinyl alcohol, etc.

The presented exemplary protection arrangement of FIG. 4 comprises also precursor feeding and control unit 154b, which can be e.g. pneumatic based (pressurized vessel) and/or mechanical based (peristaltic pump or similar) for controlling feeding rate and feeding speed of the precursor and the material formation according to the invention. The arrangement also comprises valves 155 to regulate water and other substance flows to the means 150 for forming material for the thermal spray process.

In the embodiments according to the present invention can be used as thermal spraying techniques e.g. atmospheric plasma spraying (APS), controlled atmosphere plasma spraying, vacuum plasma spraying (VPS), suspension plasma spraying (SPS), solution precursor plasma spraying (SPPS), flame spraying (FS), liquid flame spraying (LFS), high velocity oxy-fuel (HVOF) spraying, high velocity flame spraying (HVFS), suspension high velocity oxy-fuel spraying (S-HVOF), high velocity solution precursor flame spraying (HVSPFS), high velocity air-fuel (HVAF) spraying and solution precursor thermal spray processes (SPTS).

The greatest potential for protective coatings are ceramic material with the generic formula of spinel $(A,B)_3O_4$, where A and B are metallic cations. The recent interest in SOFC use is focused on $Mn_{2-x}Co_{1+x}O_4$ based spinels (where x=0 . . . 1), as these materials obtain good Cr-barrier properties against migrating Cr-species and formation of more chemically stabile $(Mn,Co,Cr)_3O_4$ spinels. Mn—Co—O spinels have cubic and tetragonal crystal structures when the stoichiometric factor x is between 0.3-0.9 in the $Mn_{1+x}Co_{2-x}O_4$ system. $Mn_{2-x}Co_{1+x}O_4$ spinels have acceptable electrical properties with electrical conductivities varying from 15 . . . 68 S/cm in a temperature range of 700 . . . 800° C., in terms of the chemical composition. Iron doping in small amount, by obtaining $MnCo_{2-x}Fe_xO_4$, most likely enhances electronic conduction. Doping causes the formation of $(Co^{2+},Mn^{2+},Fe^{3+})(Co^{2+},Co^{3+},Mn^{3+},Mn^{4+},Fe^{2+},Fe^{3+})_2O_4$ cation distribution in the spinel system, as Co cations have a stronger tendency to occupy tetrahedral sites compared to Mn cations, and Fe cations have a lower tendency to occupy tetrahedral sites than Co and Mn cations. Due to the presence of mixed valence states at octahedral sites in the $(A,B)_3O_4$ spinel system, the activation energy ($E_a$) for $MnCo_{1.9}Fe_{0.1}O_4$ is 0.38 eV, i.e. lower than the $E_a$ of $MnCo_2O_4$, which is 0.44 eV. As a result electronic conductivities of 38 . . . 72 S/cm for $MnCo_{1.9}Fe_{0.1}O_4$ at 800° C., and 85 S/cm for $MnCo_{1.8}Fe_{0.15}O_4$ at 800° C. in air can be obtained. Several other spinels, such as $CuFe_2O_4$, $CuMn_2O_4$ show great interest as well, obtaining high electrical conductivities.

Thus, while there have been shown and described and pointed out fundamental novel features of the invention as applied to a preferred embodiment thereof, it will be understood that various omissions and substitutions and changes in the form and details of the invention may be made by those skilled in the art within scope of the invention as defined by the claims. For example, it is expressly intended that all combinations of those elements which perform substantially the same results are within the scope of the invention. Substitutions of the elements from one described embodiment to another are also fully intended and contemplated. It is also to be understood that the drawings are not necessarily drawn to scale but they are merely conceptual in nature. It is the intention, therefore, to be limited only as indicated by the scope of the claims appended hereto.

The invention claimed is:

1. Protection method of solid oxide cells, in which method is arranged gas flows in the cell by at least two cell structure plates made of metal, wherein in the method is formed high temperature thermal flame to which liquid precursor is fed to form metal oxide compounds, said liquid precursor comprising metal ions, which form the desired coating with oxygen, said liquid precursor is formed from at least one of metal nitrates and metal acetates, and from solvent formed of at least one of organic compounds and water in which solvent at least one of metal nitrates and metal acetates are dissolved, and from organic compounds which stabilize the liquid precursor through the chelation resulting in a more homogenous mixture of metal complex, and from organic compounds that are exothermic above characteristic energy threshold level, and from organic compounds that form gases as reaction product and therefore further increase the atomization of the liquid precursor, and is formed the metal oxide compound material on the at least two cell structure plates made of metal from liquid precursor fed into thermal flame having average gas velocity over 200 m/s, and in the method controlling a flow rate at least of fuel, oxygen and liquid precursor in order to regulate thermal characteristics of the thermal spraying and to improve atomization of the precursor.

2. Protection method of solid oxide cells according to the claim 1, wherein in the method is formed metal oxide coating on the at least two cell structure plates.

3. Protection method of solid oxide cells according to the claim 2, wherein the metal oxide coating has a thickness less than 25 μm on the at least two cell structure plates.

4. Protection method of solid oxide cells according to the claim 1, wherein the method is inflamed high temperature thermal flame by using as fuel for the thermal spraying compound containing hydrocarbons.

5. Protection method of solid oxide cells according to the claim 1, wherein in the method is controlled a fraction of at least one of water, metal nitrates, metal acetates, organic compounds and solvent in liquid form in order to regulate thermal characteristics of the thermal spraying and to improve atomization of precursor.

* * * * *